Jan. 17, 1928.

E. A. NELSON 1,656,220

DISK WHEEL STRUCTURE

Filed April 6, 1926

INVENTOR.
Emil A. Nelson,
BY John P. Jarke,
his ATTORNEY.

Patented Jan. 17, 1928.

1,656,220

UNITED STATES PATENT OFFICE.

EMIL A. NELSON, OF ROSEVILLE, MICHIGAN, ASSIGNOR TO BUDD WHEEL COMPANY, OF PHILADELPHIA, PENNSYLVANIA, A CORPORATION OF PENNSYLVANIA.

DISK-WHEEL STRUCTURE.

Application filed April 6, 1926. Serial No. 100,012.

This invention relates to vehicle wheels and has particular reference to disk wheels which are demountable at the hub.

The primary object of the present invention is to provide a wheel structure wherein the false hub cap, normally enclosing the outer extremity of the wheel hub, and forming with the disk wheel body a neat and pleasing appearance is retained in position on the hub in a novel and highly efficient manner permitting it to be readily attached and detached independently of the demountable disk wheel, and yet securely held in position under the usual severe jarring encountered on the road.

A further object is to provide a connection of the aforesaid character which shall be simple in construction and consist of few parts that are inexpensive to manufacture and which shall be highly efficient and durable in use.

The foregoing as well as other objects and advantages will be fully described hereinafter and pointed out in the appended claims.

In the drawing accompanying and forming a part of this application:

Figures 1, 2, 3:
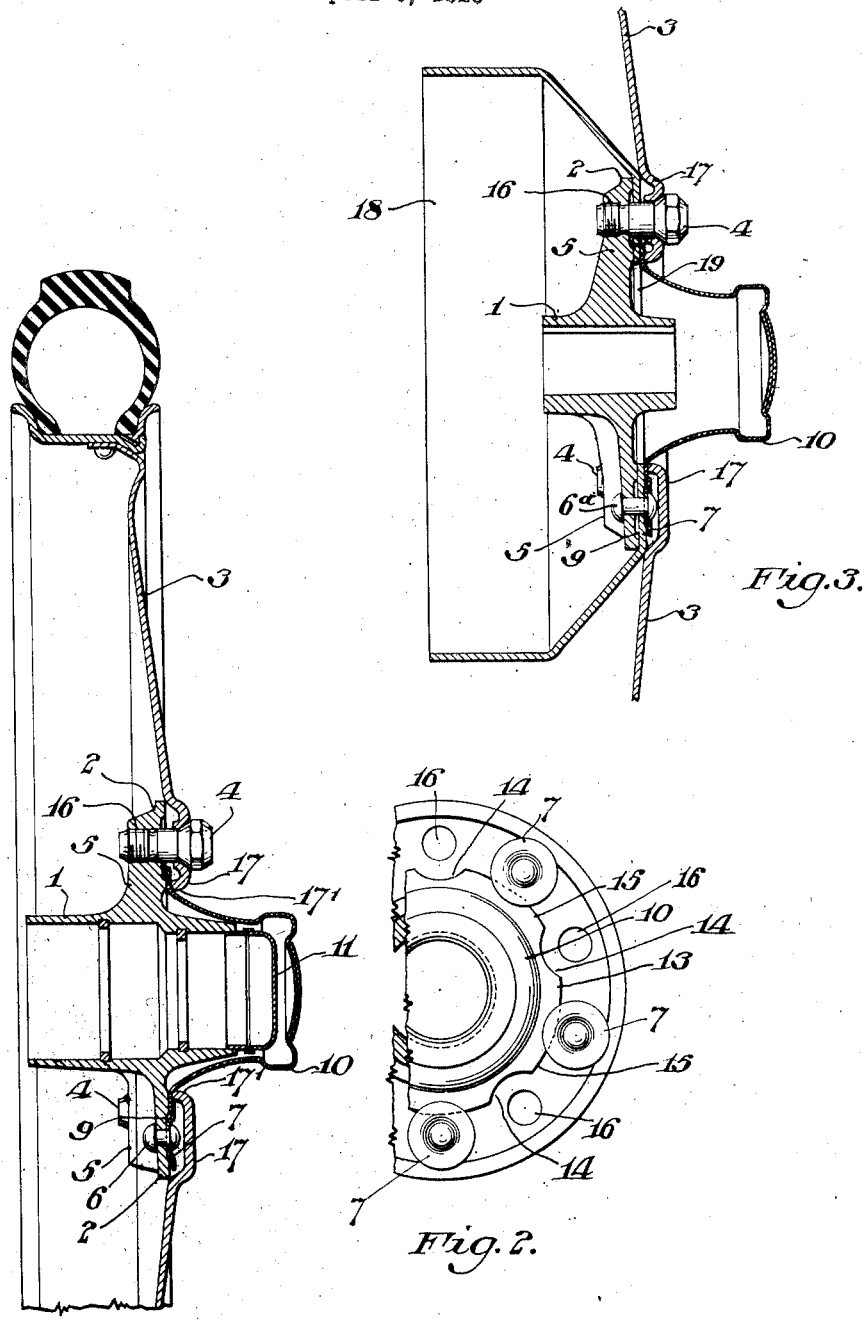
Fig. 1 is a fragmentary sectional view through a wheel embodying my invention.
Fig. 2 is a fragmentary side elevation of the hub portion thereof.
Fig. 3 is an enlarged fragmentary sectional view of a modified form of hub structure embodying my invention and showing a brake drum incorporated therewith.

A wheel embodying my invention comprises a hub 1 having an annular flange 2 formed thereon and to which a disk wheel 3 of any suitable or approved type is detachably connected as by means of bolts or studs 4. These studs are threaded in thickened portions 5 formed on flange 2 and intermediate these thickened portions said flange is provided with apertures that receive each, a rivet 6 which serves to fasten a sheet metal disk 7 on the face of the hub. As shown particularly in Fig. 1, each disk is formed with a depressed central portion that seats within an annular recess 9 in the face of flange 2, and the outer marginal edge of each disk is spaced slightly from the surface of the flange so as to receive the peripheral edge of a hub cap 10.

The false hub cap 10 is of a suitable size and shape to enclose the outer end of the wheel hub and also an inner hub cap 11 which is fitted into the end of the hub, as clearly shown in Fig. 1. The marginal edge portion 13 of the hub cap 10 seats against the face of the hub flange 2 and is formed with a plurality of notches 14 which define lips 15 therebetween and these lips are adapted to engage beneath the disks 7 to retain the hub cap in position. At this point, it will be noted that the outer hub cap is placed in position by placing portion 13 of the hub cap against the flange 2 with the notches 14 in register with disks 7, such notches permitting the lips 15 to pass between the disks 7 and engage the flange 2, after which a slight rotation of the hub cap will engage the lips beneath the disks 7 and also bring notches 14 opposite the threaded apertures 16 which receive the studs 4.

The hub cap being positioned as above described, the disk wheel 3 is placed against flange 2 so that the studs 4 may be engaged in their threaded bores 16 and the studs are then tightened to secure the disk wheel to the hub. The annular rib 17 surrounding the central opening of the wheel disk provides spaced seats whereby the wheel disk engages through one of said seats the peripheral edge of the flange 2, and engages through the other of said seats (the inturned flange 17'), the edge portion 13 of the hub cap and clamps the same securely to the hub flange.

In Fig. 3 I have shown a slightly modified form of wheel wherein a brake drum 18 is incorporated in the assembly. In this instance, the wheel hub is inserted through an aperture 19 in the face of the drum so that the outer face of the flange 2 contacts with the inner face of the drum, and the two elements are fastened by the rivets 6ª which are similar to rivets 6, previously described, except that the former are of increased length to extend through the flange 2, brake drum 18 and disks 7. The remaining structure is identical with that previously referred to in connection with Figs. 1 and 2, except for the fact that the brake drum has been introduced between the hub flange 2 and the hub cap 10, hub cap securing disks 7 and the wheel disk 3. In this construction the brake drum is additionally secured to the hub by the stud 4.

The wheel is demounted in the usual manner by removing bolts or studs 4. The hub cap 10 is retained in position during and after such operation by the disks 7. If it is desired to remove the hub cap, this can be easily accomplished by slightly rotating the same until notches 14 register with disks 7. It will be noted that, when the wheel is mounted, the inner marginal edge thereof completely overlaps the notches 14 and lips 15 and thus effects a clamping action on the hub cap over a maximum area to securely retain the same in position and also to present a neat and pleasing appearance.

What I claim is:

1. A wheel of the character set forth comprising a hub member having a flange, a wheel disk demountably secured to said flange, and a hub cap normally enclosing the outer end of said hub and having a portion thereof clamped between said flange and wheel disk, and means for retaining the hub cap in place after the wheel disk has been dismounted.

2. A wheel of the character set forth comprising a hub member having a flange, a hub cap normally enclosing the outer end of said hub and having a portion engaged with said flange, means to detachably retain said hub cap in position, and a wheel disk demountably secured to said flange and serving when mounted to additionally secure the hub cap in position.

3. A wheel of the character set forth comprising a hub member having a flange, a hub cap normally enclosing the outer end of said hub, and having a portion engaged with said flange, means to detachably retain the same in position, and a wheel disk demountably secured to said flange and engaging said hub cap to clamp the same in position.

4. A wheel of the character set forth comprising a hub member having a flange, a plurality of fixed locking elements connected to and spaced from said flange, a hub cap normally enclosing the outer end of said hub and having portions adapted to engage beneath said elements by relative rotation of said hub cap and flange whereby to releasably secure the hub cap to the flange.

5. A wheel of the character set forth comprising a hub member having a flange carrying removable wheel locking devices, a hub cap normally enclosing the outer end of said hub and a plurality of projections carried by said flange independently of the wheel locking devices and adapted to engage the marginal edge of said hub cap to retain the same in position.

6. A wheel of the character set forth comprising a hub member having a flange, a hub cap normally enclosing the outer end of said hub, a plurality of projections carried by and spaced from said flange, said projections being adapted to overlap the marginal edge of said hub cap to retain the same in position, and a wheel detachably connected to said flange and adapted to engage said hub cap to clamp the same in position.

7. A wheel of the character set forth comprising a hub member having a flange, a hub cap normally enclosing the outer end of said hub and a plurality of disks carried by and spaced from said flange, said disks being adapted to overlap the marginal edge of said hub cap to removaby hold the same in position.

8. A wheel of the character set forth comprising a hub member having a flange, a hub cap normally enclosing the outer end of said hub and having a marginal edge portion adapted to abut against said flange, a plurality of disks carried by said flange and adapted to engage the marginal edge portion of said hub cap to retain the same in position, and a wheel disk detachably connected to said flange and adapted to overlap the marginal edge portion of said hub cap to clamp the same in position.

9. A wheel of the character set forth comprising a hub member having a flange, a circumferential series of disks connected to and spaced from said flange, a hub cap normally enclosing the outer end of said hub, and having a marginal edge portion adapted to seat against said flange, said marginal edge portion having notches thereon defining lips, said lips being adapted by relative rotation of hub cap and hub, to engage beneath said disks to retain said hub cap in position.

10. A wheel of the character set forth comprising a hub member having a flange, a brake drum connected to said flange, a circumferential series of disks arranged on said flange, fastening means extending through said brake drum, flange, and disks, said disks having the edge portions thereof spaced from said flange, a hub cap normally enclosing the outer end of said hub and having a marginal edge portion adapted to seat on said flange, said edge portion having a plurality of notches therein adapted to receive said disks and define lips therebetween, said lips being adapted by relative rotation of the hub cap and hub to engage beneath said disks to retain said hub cap in position.

11. A wheel of the character set forth comprising a hub member having a flange, a brake drum connected to said flange, a circumferential series of disks arranged on said flange, fastening means extending through said brake drum, flange, and disks, said disks having the edge portions thereof spaced from said flange, a hub cap normally enclosing the outer end of said hub and having a marginal edge portion adapted to abut said flange, said edge portion having a plurality of notches therein adapted to receive said disks and define lips therebetween, said lips being adapted to engage beneath said disks to retain said hub cap in position, and a wheel detachably connected to said flange and adapted to overlap said marginal edge portion to clamp said hub cap in position.

12. A wheel of the character set forth comprising a hub having a radial flange, a hub cap adapted to be detachably secured to said flange, means for so securing said hub cap, a brake drum also adapted to be secured to said flange, and common means for securing said hub cap securing means and said brake drum to the hub flange.

13. A wheel of the character set forth comprising a hub having a radial flange, a hub cap adapted to be detachably secured to said flange, means for so securing said hub cap comprising elements secured to said flange, a brake drum also secured to said flange, and common securing means for said elements and brake drum.

In testimony whereof he hereunto affixes his signature.

EMIL A. NELSON.